(Model.)
A. THOMPSON & G. H. RICE.
CASTER.
No. 291,426. Patented Jan. 1, 1884.
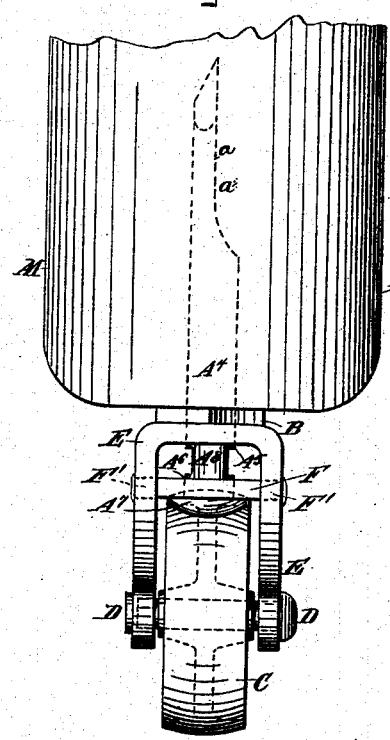
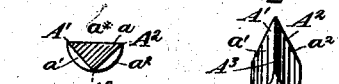
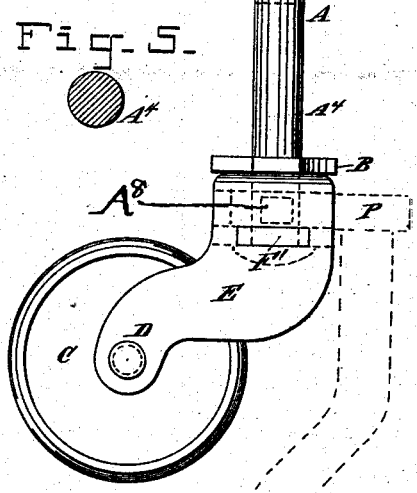
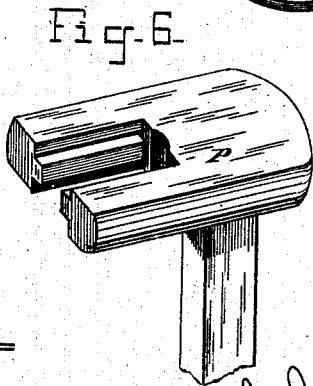
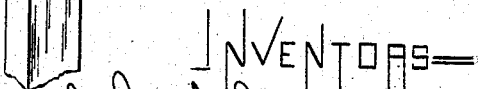

United States Patent Office.

ARTHUR THOMPSON AND GEORGE H. RICE, OF BROOKLYN, NEW YORK, ASSIGNORS TO THEMSELVES, ISAAC MASON, AND EDWARD C. BARLOW, ALL OF SAME PLACE.

CASTER.

SPECIFICATION forming part of Letters Patent No. 291,426, dated January 1, 1884.

Application filed April 25, 1883. (Model.)

*To all whom it may concern:*

Be it known that we, ARTHUR THOMPSON and GEORGE H. RICE, both of Brooklyn, in the county of Kings and State of New York, have invented certain new and useful Improvements in Casters, of which the following is a specification.

We employ sheet metal for the horn or swiveling portion, in which the caster-wheel is mounted, and which turns as required in different directions. We have devised a construction which is cheaply and rapidly made from common sheet-iron, brass, or steel, giving much greater strength and presenting a more graceful appearance than the ordinary horn of cast metal. It also facilitates the employment of a shank which requires to be forcibly turned. Our horn or swivel affords two good bearings on the shank, and allows the employment of a forked piece to engage with the shank between the bearings, and thereby turn the shank with any required degree of force. It avoids the necessity for any squared portion of the shank above the swivel. We make the shank somewhat in accordance with the patent to one of us, (Thompson,) dated November 14, 1882, No. 267,380; but we have made material improvements therein by the sheet-metal horn and the dispensing, as above explained, with the necessity for a squared part above the horn, and also by making the shank completely cylindrical for a portion of its length where it enters the wood. Our improved caster requires less depth than usual below the leg in which it is fitted, and gives strength, grace, and lightness. The improvement gives a better bearing in the wood and promotes its easy insertion in the correct position.

The accompanying drawings form a part of this specification, and represent what we consider the best means of carrying out the invention.

Figure 1 is an elevation showing the device in place in the leg of a bedstead or other piece of furniture. Fig. 2 is a view at right angles to Fig. 1. It shows the caster alone, without the wood. The tool by which the shank is inserted is partly shown in dotted lines. Figs. 3, 4, and 5 are cross-sections at corresponding levels in the shank. Fig. 6 is a perspective view of the head of the tool adapted to urge and strongly turn the shank. It is on a larger scale.

Similar letters of reference indicate like parts in all the figures where they occur.

M is a portion of the leg of a table or other article of furniture.

A is the shank of the caster, certain portions being designated, when necessary, by additional marks, as $A'\ A^2$. It is of steel or hard iron. Its upper end is swaged, milled, or otherwise formed with two inclined planes, $a'\ a^2$, cutting each other as indicated, and presenting three inclined angular edges, $A'\ A^2\ A^3$, arranged to cut or scrape the wood when the device is turned in inserting it in a leg. A considerable length of the lower portion of the shank is left in its full cylindrical form, as indicated by $A^4$. Above this is a cavity, $a^*$, in which the woody material is compacted after it is reduced to a fine condition by the action of the edges $A'\ A^2\ A^3$. Below the wood the shank may protrude to a less distance than usual, terminating with a large head, $A^7$. Above this are two cylindrical portions, $A^5\ A^6$, which serve as efficient bearings for the horn. Between $A^5\ A^6$ is a sufficient flattened portion, $A^8$, to allow a firm hold to be taken by a suitable forked tool, P, (see Fig. 6,) applied by a lateral movement, and adapted to be strongly turned by a bit-brace or other suitable means to insert the shank in the wood. We employ a wrought-metal horn. It is formed of two pieces of sheet-iron, steel, semi-steel, or other suitable rolled metal, E F, cut by dies or other means. They are put together by a process analogous to riveting—that is to say, the part F is formed with reduced ends $F'$, which fit closely in corresponding holes in the larger bent part E, and the protruding ends headed by pressure in dies, or by other suitable means. The part E fits closely around the bearing $A^5$. The part F fits closely around the bearing $A^6$. When the tool P is engaged with the flattened portion $A^8$, it may be turned as rapidly and forcibly as desired to insert the shank, the horn and its attachments turning with it.

C is the wheel, mounted in the part E by a pin, D, which is headed, so as to be securely retained, as will be understood.

B is a tight-fitting washer, forced upon the shank after the latter is properly introduced into the horn. It holds the parts together to allow their being properly handled.

Modifications may be made in the forms and proportions. A greater or less length of shank may be inserted in the wood.

The cavity $a^*$, in which the woody material is densely compacted during the insertion, may be made longer than shown, or it may succeed if somewhat shorter.

Our experiments indicate the proportions shown as the best.

The peculiarity of the boring-point and of the pod may be made the subject of a separate application for patent.

We claim as our invention—

1. A caster-swivel made in two parts, E F, the part F bridging across and connecting the two arms of the part E and strongly uniting them, as herein specified.

2. In a caster, the shank A, having a flattened portion, $A^s$, in combination with a swivel, E F, having one bearing above and the other below such flattened portion, adapted to serve as herein specified.

3. The shank A, having a flattened portion, $A^s$, and the caster-swivel E F, having a bearing above and below the said flattened portion, in combination with each other and with the pin D and wheel C, adapted to serve in the leg M, as herein specified.

In testimony whereof we have hereunto set our hands, at New York city, N. Y., this 23d day of April, 1883, in the presence of two subscribing witnesses.

ARTHUR THOMPSON.
GEO. H. RICE.

Witnesses:
EDWARD C. BARLOW,
ISAAC MASON.